June 10, 1952 D. H. ANNIN 2,599,534
FLUID FLOW CONTROL APPARATUS
Filed June 20, 1945
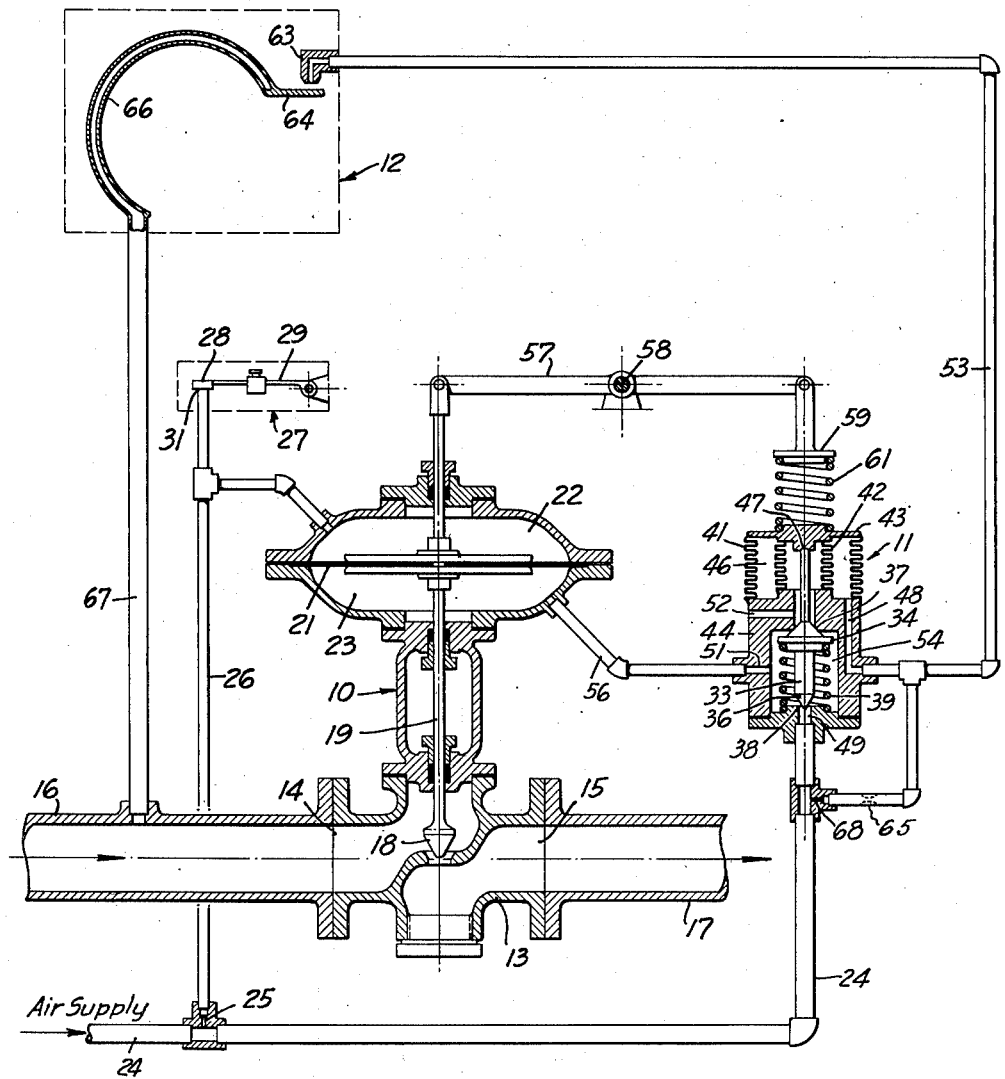
INVENTOR.
Douglas H. Annin
BY
ATTORNEY Patented June 10, 1952

2,599,534

UNITED STATES PATENT OFFICE 2,599,534

FLUID FLOW CONTROL APPARATUS

Douglas H. Annin, Oakland, Calif., assignor, by mesne assignments, to M & J Engineering Co., a partnership Application June 20, 1945, Serial No. 600,610

2 Claims. (Cl. 137—153)

This invention relates generally to apparatus for controlling the flow of various fluids. More particularly the invention relates to fluid flow control apparatus making use of so-called "motor valve" or diaphragm operated valve means.

It is an object of the present invention to provide apparatus of the above character which is featured by simplicity with respect to the equipment required, which is reliable and accurate in operation, and which affords substantially instantaneous response.

Another object of the invention is to provide apparatus of the above character characterized by the use of a single seated motor valve having gas or pneumatic loading for its operating diaphragm, in place of the conventional loading spring.

Another object of the invention is to provide novel apparatus for back pressure regulation, which employs a simple pilot valve means operating through a valve positioner, and without use of a loading spring for the associated motor valve.

Additional objects of the invention will appear from the following description in which the preferred embodiment has been set forth in detail in conjunction with the accompanying drawing.

The present invention makes use of a motor valve of the diaphragm operated type, together with a simple type of so-called valve positioner. The valve positioner has a suitable motion transmitting connection to a moving part of the motor valve in order to secure proportionate incremental operation as will be presently explained. A controlling instrument or device such as a simple pilot valve means connects with the apparatus through the valve positioner, thus affording a combination making possible incremental movements of the motor valve in direct proportion to variations in the controlling pressure over a given operating range.

The drawing diagrammatically illustrates a combination for back pressure regulation which includes a motor valve or primary valve designated generally at 10, together with a valve positioner 11, and a controlling instrument or device 12. The motor valve consists of a suitable valve body 13 having inflow and outflow passages 14 and 15. Inflow passage 14 can connect with piping 16 as illustrated, which in turn forms or is connected to a gas pressure system receiving gas from some source of supply. Outlet pipe 17 can vent to the atmosphere or connect with a relatively low pressure system. The valve member 18 within body 13 is shown connected to the conventional operating rod 19, which in turn connects to the operating diaphragm 21. The diaphragm is carried by a suitable mounting means such as illustrated, whereby gas chambers 22 and 23 are formed on its opposite sides. The upper chamber 22 is connected to a source of air or other gas at substantially constant pressure. Thus air supply pipe 24 is shown connected through the small flow restricting orifice 25, with pipe 26 leading to chamber 22. A small back pressure regulator 27 is connected to pipe 26 in order to maintain a desired pressure level. As diagrammatically illustrated this device can consist of a flapper valve member 28 carried by the weighted lever 29, and normally urged toward the seat 31. This arrangement provides a substantially constant gas pressure loading upon diaphragm 21 tending to urge the same in a direction to close the primary valve member 18.

The valve positioner 11 can vary in design but should include valve means of the supply and waste type, in conjunction with Sylphon tubes or like fluid pressure operated member having its operating chamber available for pneumatic connection with the controlling device 12. As diagrammatically illustrated the positioner in this instance includes a valve member 33 having its ends 34 and 36 formed to cooperate with the stationary valve seats 37 and 38. Compression spring 39 serves to urge member 33 in a direction to close upon seat 37. A pair of Sylphon tubes or metal bellows 41 and 42 have their ends attached to the plate 43 and to the body 44, to form the closed fluid chamber 46 between the same. An operating stem 47 extends upwardly from valve member 33 to make operative abutment with the plate 43. The body 44 is provided with ducts or passages 48, 49, 51 and 52. Duct 48 connects the chamber 46 with a pipe 53 leading to the controlling device 12. Duct 49 communicates through seat 38 and is connected to the air supply pipe 24. Duct 51 communicates with the inner body space 54 and is connected by pipe 56 to the gas chamber 23 below the diaphragm 21. Duct 52 can vent directly to the atmosphere as illustrated.

A direct mechanical connection is provided between the moving parts of the motor valve 10 and the moving parts of the positioner 11. Thus the upper end of rod 19 is shown pivotally attached to one end of a lever 57. This lever has an intermediate fulcrum support 58, and has its other end pivotally connected to a thrust member 59 which seats upon the upper end of a compression spring 61. The lower end of this spring seats upon the plate 43 of the valve positioner.

The controlling device 12 consists in this instance of a simple valve means operated by an element responsive to variations in pressure within the inflow piping 16. Thus as diagrammatically illustrated a stationary seat 63 has its orifice connected with the pipe 53, and cooperates with a flapper valve member 64. The pressure responsive element 66 is in the form of a "Bourdon" tube having its free end attached to the flapper valve 64. The pipe 67 serves to connect the interior of the "Bourdon" tube with the inflow piping 16. Pipe 53 has restricted communication with a source of pressure, as for example with pipe 24 through restricted orifices 65 and 68.

To explain operation of the apparatus described above, it is presumed that the apparatus is to be used for back pressure regulation, and that air is being supplied to the pipe 24 at a suitable pressure. Back pressure regulator 27 serves to maintain relatively constant pneumatic pressure in chamber 22 to urge diaphragm 21 downwardly, and assuming that the pressure in piping 16 has not been built up to the desired value, valve 18 is maintained closed. When the pressure in pipe 16 builds up to a value slightly above the minimum pressure level which it is desired to maintain, "Bourdon" tube 66 is fixed in a direction serving to close flapper 64 toward its seat 63, and this causes a building up of pressure in pipe 53 and chamber 46 of the valve positioner, to cause valve member 33 to close toward seat 37 and to open with respect to seat 38. Flow of air through pipe 24, seat 38, space 54 and pipe 56 to chamber 23 serves to overcome the loading pressure upon the top of the diaphragm with the result that the diaphragm is flexed upwardly to open the valve member 18. Such opening movement is immediately accompanied by application of increased force to the Sylphon operator of the valve positioner, through spring 61, thereby tending to move valve member 33 downwardly to close upon seat 38 and open seat 37 to permit some venting through duct 52. As a result the valve member 18 takes a position within its operating travel dependent upon the value of the controlling pressure applied through pipe 53. Assuming a drop in pressure in piping 16 below the minimum desired, such pressure reduction causes complete opening of flap valve 64, thus reducing the pressure in pipe 53 and chamber 46 in the valve positioner. This causes downward movement of valve member 33 to close upon seat 38 and to effect venting of chamber 23 through pipe 56, space 54, seat 37 and duct 52. Thus the pressure in chamber 23 is reduced so that the gas loading upon the diaphragm is sufficient to force the valve member 18 closed.

Assuming that the pressure in piping 16 tends to maintain itself whereby continual flow at varying rates is required through the motor valve in order to maintain the pressure at substantially constant value, then the motor valve by virtue of its connection with the valve positioner, is automatically moved to different operating positions within its full range of movement for relatively accurate pressure control, and the increments of movement are directly proportional to increments of pressure change in pipe 53 over the effective range of operation. This is similar to the action of valve positioners which have been used in the past in conjunction with spring loaded motor valves, and is well known to those skilled in the art.

A particular feature of the apparatus described above is that it eliminates in entirety the customary loading springs used in conjunction with motor valves. In place of such springs I utilize simple gas loading which acts with constant force upon the diaphragm. When flexing of diaphragm 21 occurs, the resulting change in the volume of chamber 22 does not cause a corresponding change in pressure and loading, due to the action of regulating device 27. Because the loading is maintained constant it need not be excessive, thus facilitating design of the motor valve and diaphragm mounting and making possible manual movement of the motor valve against the loading. Should there be a complete failure of pressure from line 24, the loading pressure in chamber 22 is relieved after a short interval by backflow through flow restricting orifice 25. Because at the same time pressure in chamber 23 is reduced to atmospheric, the diaphragm 21 is now free to be moved except for differential force which may be applied to the valve member 18. In combination with gas pressure loading I employ a simple seated valve (18), thus avoiding the many complications and disadvantages incident to use of so-called balanced double seated valves. Use of a single seated valve is made possible because I utilize gas pressure loading in combination with a valve positioner.

In contrast with the above it is conventional practice to use double seated valves with heavy and cumbersome loading springs which must be compressed by jacking means to permit emergency manual operation. Such springs must be excessively large and heavy in order to exert sufficient loading force over the entire valve travel.

Another feature of the apparatus is that regulating device 12 is of the simple direct acting type, and has its controlling line 53 connected with the valve positioner pressure chamber. Thus I avoid the complications which would be involved in making pneumatic control connection between the controlling device and the main pressure chamber of the motor valve, as is common in prior apparatus. The latter arrangement would require use of double valves in the controlling system, in addition to a complete valve positioner and its pneumatic operating means.

My apparatus is characterized by sensitive instantaneous response over its full range of operation, in contrast with the sluggish response obtained from conventional motor operated valves having instrument control through pilot valves.

It should be understood that the apparatus described above is susceptible of variations. For example device 12 can be any form of instrument operated for example by temperature changes, pressures, etc. and supplied with simple valve means for controlling venting from pipe 53. In such arrangements the motor valve would not operate as a back pressure regulator, but would operate to control the flow of fluid through a line in response to variations of an extraneous controlling factor, as for example temperature, pressure, etc.

I claim:

1. In apparatus for controlling flow of fluids, a primary valve means including a single primary valve member movable in opposite directions with respect to a single seat between open and closed positions, a primary fluid pressure operated member directly connected to operate the valve member, means forming closed loading and operating chambers on opposite sides of said fluid pressure operated member, regulating means for supplying air to said loading chamber at substantially constant pressure to thereby provide a constant loading force on said primary fluid pressure operated member for all operating positions of the same, a pneumatic valve positioner means having a movable valve member of the supply and waste type and having another fluid pressure operated member with a closed chamber on one side of the same for operating said last-mentioned valve member, and a mechanical motion applying connection between said primary fluid pressure operated member and the fluid pressure operated member of the positioner means, said connection including a spring through which force is applied to the fluid pressure operated member of the positioner in accordance with the positioning of the primary valve member, means forming a connection from both said regulating means and said valve positioner means to a common source of air supply, said valve positioner means having a pneumatic connection with said operating chamber, said valve positioner means serving to supply or vent gas from said operating chamber to cause movement of said fluid pressure operated member over increments of travel proportionate to various pressure values applied to the closed chamber of the pneumatic valve operating means.

2. In apparatus for controlling flow of fluids, primary valve means including a single primary valve member movable in opposite directions relative to a single seat between open and closed positions, a primary fluid pressure operated member directly connected to operate the valve member, mounting means forming closed loading and operating chambers on opposite sides of the fluid pressure operated member, the loading chamber being located on that side of said primary fluid pressure operated member which is remote from the primary valve member, regulating means for supplying air under constant pressure to said loading chamber, a pneumatic valve positioner means having a movable valve member of the supply and waste type and having a fluid pressure operated member with a closed chamber on one side of the same for operating said last-mentioned valve member, mechanical connecting means including a spring forming a motion applying connection between said primary fluid pressure operated member and the fluid pressure operated member of the valve positioner means, said connecting means including a part extending into said loading chamber from the exterior thereof, said spring serving to apply force to the fluid pressure operated member of the valve positioning means in accordance with the position of said primary fluid pressure operated member, means forming a connection from both said regulating means and said valve positioner means to a common source of air supply, said valve positioner means having a pneumatic connection with the operating chamber, said valve positioner means serving to supply or vent gas from said operating chamber to cause movement of said primary pressure operated member over increments of travel proportionate to various pressure values applied to the chamber of the valve positioning means.

DOUGLAS H. ANNIN.

REFERENCES CITED

The following references are of record in the file of this patent:

UNITED STATES PATENTS

| Number | Name | Date |
| --- | --- | --- |
| 1,301,405 | MacDougald | Apr. 22, 1919 |
| 1,726,726 | Wettstein | Sept. 3, 1929 |
| 1,976,820 | Wettstein | Oct. 16, 1935 |
| 2,047,581 | Grissett | July 14, 1936 |
| 2,111,837 | Brisbane | Mar. 22, 1938 |
| 2,179,450 | Gorrie | Nov. 7, 1939 |
| 2,264,262 | Erbguth | Nov. 25, 1941 |
| 2,270,304 | Jacobson | Jan. 20, 1942 |
| 2,382,941 | Moore | Aug. 14, 1945 |

FOREIGN PATENTS

| Number | Country | Date |
| --- | --- | --- |
| 507,252 | Great Britain | June 13, 1939 |